United States Patent
Taguchi et al.

(10) Patent No.: US 7,469,571 B2
(45) Date of Patent: Dec. 30, 2008

(54) DATA STORAGE DEVICE

(75) Inventors: Masakazu Taguchi, Kawasaki (JP); Michio Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/386,384

(22) Filed: Mar. 22, 2006

(65) Prior Publication Data

US 2007/0125151 A1    Jun. 7, 2007

(30) Foreign Application Priority Data

Dec. 1, 2005    (JP)    ............................. 2005-347879

(51) Int. Cl.
G01M 13/00    (2006.01)
G01M 15/00    (2006.01)
G01M 17/00    (2006.01)
G01M 17/04    (2006.01)
G01M 19/00    (2006.01)
G01N 3/30    (2006.01)

(52) U.S. Cl. .................................................. 73/11.04
(58) Field of Classification Search .............. 73/11.04
See application file for complete search history.

(56) References Cited

U.S. PATENT DOCUMENTS 5,452,612 A * 9/1995 Smith et al. ............... 73/514.34
6,597,532 B1 * 7/2003 Usui et al. ................ 360/97.03
6,665,633 B2 * 12/2003 Fioravanti et al. ............ 702/182
6,674,600 B1 * 1/2004 Codilian et al. ................ 360/75
6,721,122 B2 * 4/2004 Aikawa et al. ............ 360/77.02
6,961,202 B2 * 11/2005 Ikedo et al. ............... 360/77.02

FOREIGN PATENT DOCUMENTS

JP    06-259861    9/1994
JP    11-045530    2/1999

* cited by examiner

Primary Examiner—Edward Lefkowitz
Assistant Examiner—Octavia Davis
(74) Attorney, Agent, or Firm—Greer, Burns & Crain, Ltd.

(57) ABSTRACT

A data storage device is provided that is suitable for use under the environment where mechanical shock is frequently applied. The data storage device includes plural storage units as closed structures each of which houses a storage medium therein, the storage medium being capable of moving relative to a head for access, an external force detection portion for outputting signals corresponding to external forces applied to the storage units in plural directions, and a controller for controlling the storage units. The storage units are arranged in such a manner that the storage units are different from one another in a direction of relative movement between the storage medium and the head, and the controller selectively makes one or more of the storage units perform an access operation in accordance with the signal outputted from the external force detection portion.

3 Claims, 12 Drawing Sheets

| DE | a | b | c |
|----|----|----|----|
| 11 | Y' | X | Z |
| 12 | X' | Y | Z' |
| 13 | X | Z' | Y |
| 14 | Z | X' | Y' |
| 15 | Y | Z | X |
| 16 | Z' | Y' | X' |

DATA STORAGE DEVICE

BACKGROUND OF THE INVENTION

1. Field of the Invention

The present invention relates to data storage devices for performing one or both data record and data reproduction by moving a storage medium and a head relative to each other. The present invention can apply, for example, to magnetic disk devices including a hard disk drive as a storage medium.

2. Description of the Related Art

Magnetic disk devices have recently been used in various types of equipment such as car navigation systems and portable music players with a neck strap, in addition to external storage devices for computers. Along with this diversification, environment to be expected for the use expand to include harsh environment where temperature or humidity fluctuates substantially and where a major impact force is exerted in unspecified directions. Even when usage patterns of magnetic disk devices are diversified as described above, the importance of preventing data loss remains unchanged.

Magnetic disk devices including hard disk drives are configured to have a closed shape for preventing dust from adhering to disks. In practice, however, the inside is connected to the outside air through a filter. The reason for the closed shape is that a head is placed only an extremely short distance of approximately 10 nm above a spinning disk for record and reproduction (for writing and reading). Such a closed structure is called a disk enclosure, i.e., a DE for short. The disk enclosure houses a head gimbal assembly (HGA), a voice coil motor (VCM), a head amplifier (HDA) and a spindle motor (SPM) together with a disk. Some disk enclosures house plural disks for the purpose of increasing storage capacity.

The effect of mechanical shock on a magnetic disk device depends on the direction of an impact force. In general, the effect of shock in the circumferential direction of a disk, i.e., in the direction of relative movement between the disk and a head is relatively small. The shock in the disk diameter direction, i.e., in the seek direction causes off-track that the head does not follow predetermined tracks, resulting in an access error. A head slider accidentally touches the disk due to the shock in the rotation axis direction of the disk. The accidental touch is called a crash due to which the disk surface is partially cut and dust scatter. The scattered dust incurs further crash. The resistance to external forces of a typical head gimbal assembly is relatively low with respect to the force in the direction along which the head is pulled from the disk. However, it is relatively high with respect to the force in the direction along which the head is pushed toward the disk. In the case of a double-sided recordable disk, a force for pulling a head from one surface of a disk works to move the head away from the other surface of the disk.

Japanese unexamined patent publication No. 6-259861 is a related art document concerning data integrity toward mechanical shock. The publication discloses that, in a system including a plurality of magnetic disk devices and having a configuration capable of mirroring, magnetic disk devices serving as masters in mirroring and magnetic disk devices serving as shadows in mirroring are arranged in a manner to make their disk surfaces different between these devices. In the system configuration disclosed in the publication, when shock in a certain direction is applied to the system, one of the master magnetic device and the shadow magnetic device is less affected than the other. In other words, the probability is low that both the master magnetic devices and the shadow magnetic devices become inaccessible due to shock, compared to the configuration in which all magnetic disk devices are arranged in the same orientation.

Japanese unexamined patent publication No. 11-45530 describes a magnetic disk device including acceleration sensors. This magnetic disk device monitors external forces using the acceleration sensors and moves a slider away from a record/reproduction area when a predetermined external force is applied.

Data storage devices with plural disk enclosures have been expected to be used as relatively large equipment used with being fixedly installed like servers or large-capacity storages. The data storage devices of the type have not been expected to be used as small equipment used under the situation where unspecified vibration or shock is often applied, like in-vehicle equipment or portable players. For this reason, when the conventional data storage devices are used under the environment where vibration or shock is often applied, serious malfunction causing data loss may occur or the situation where access is interrupted due to retraction control may continue for a long period of time.

SUMMARY OF THE INVENTION

The present invention is directed to solve the problems pointed out above, and therefore, an object of the present invention is to provide a data storage device that is suitable for use under the environment where mechanical shock is often applied.

According to one aspect of the present invention, a data storage device includes plural storage units as closed structures each of which houses a storage medium therein, the storage medium being capable of moving relative to a head for access, an external force detection portion for outputting signals corresponding to external forces applied to the storage units in plural directions, and a controller for controlling the storage units, wherein the storage units are arranged in such a manner that the storage units are different from one another in a direction of relative movement between the storage medium and the head, and the controller selectively makes one or more of the storage units perform an access operation in accordance with the signal outputted from the external force detection portion.

Since the plural storage units differ from one another in orientation in the arrangement, effect when an external force in a certain direction is applied is different among the storage units. The controller selects from among the storage units one or more of the storage units that are made to perform an access operation for record/reproduction in accordance with the direction of an external force or the direction and the magnitude thereof, i.e., in accordance with the degree of the effect due to the external force. The permission of an access operation is determined for each of the storage devices in accordance with the external force, and a non-operational period of each of the storage devices is shortened as far as possible without interfering with data integrity.

The selection of one or more of the storage units that are made to perform the access operation includes the following two patterns: 1. The controller has information indicating a relationship between each of the storage units and directions of external forces against which each of the storage units has good impact resistance, determines whether each of the storage units has good or poor impact resistance based on the information and the signal outputted from the external force detection portion and selects one or more of the storage units having the good impact resistance. 2. Each of the storage units is provided with an acceleration sensor. The controller determines magnitude of an external force applied to each of the storage units based on the output from the acceleration sensors to select one or more of the storage units to which a smaller external force is applied.

The present invention makes it possible to realize a data storage device that is suitable for use under the environment where mechanical shock is frequently applied.

These and other characteristics and objects of the present invention will become more apparent by the following descriptions of preferred embodiments with reference to drawings.

DESCRIPTION OF THE PREFERRED EMBODIMENTS

Figure 1:
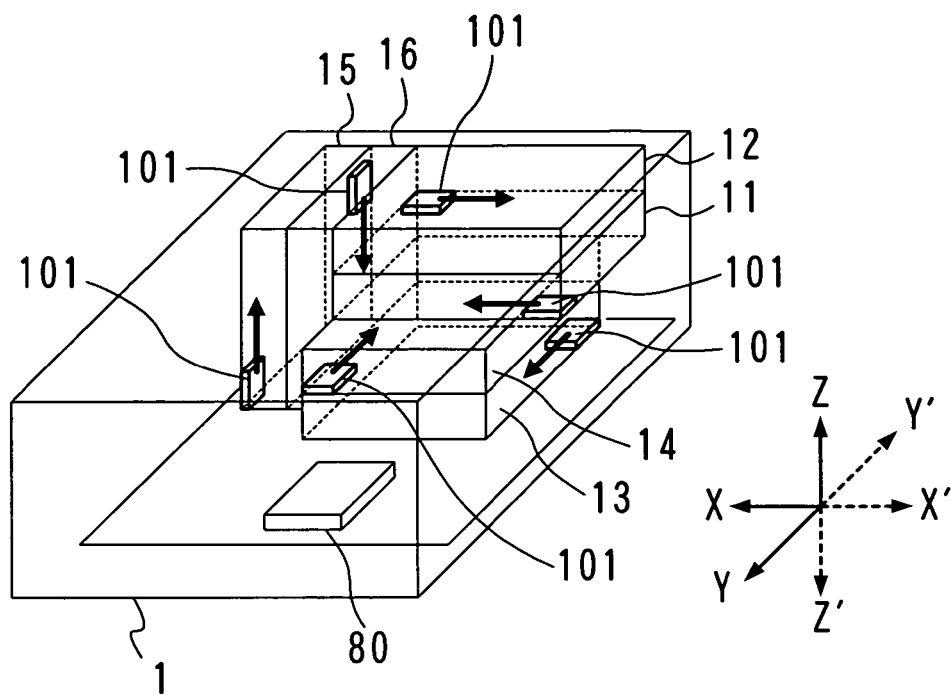
FIG. 1 is a diagram showing a schematic configuration of a first magnetic disk device according to the present invention.
Figure 2:
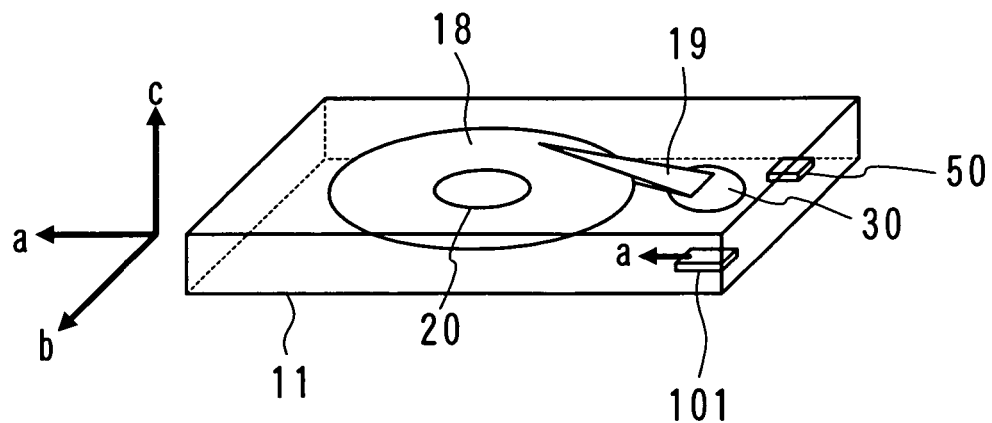
FIG. 2 is a diagram showing one example of an internal structure of a disk enclosure.

FIG. 1 is a diagram showing a schematic configuration of a first magnetic disk device according to the present invention and FIG. 2 is a diagram showing one example of an internal structure of a disk enclosure.

The magnetic disk device 1 is a data storage device including six disk enclosures 11, 12, 13, 14, 15 and 16 with the same structure and a controller 80 having an integrated circuit. Each of the disk enclosures 11-16 corresponds to a storage unit according to the present invention. The controller 80 controls operations of the disk enclosures 11-16. Note that the disk enclosure is hereinafter sometimes referred to as a DE.

Referring to FIG. 2, the disk enclosure 11 is illustrated as a representative example of the disk enclosures 11-16. The illustrated disk enclosure 11 houses at least one disk 10 as a recording medium, a head gimbal assembly 19 for supporting a head slider (not shown), a spindle motor 20 for turning disks, a voice coil motor 30 for performing seek operations, a head amplifier 50 for amplifying data signals and an acceleration sensor 101 relating to the present invention deeply. While the outer shape of the illustrated disk enclosure 11 is a rectangular parallelepiped with a small thickness, the outer shape thereof is not limited thereto.

The acceleration sensor 101 is a piezoelectric type that applies, for example, a piezo-resistive element and is a single axis sensor for outputting signals depending on the magnitude of an impact force (acceleration) in one direction. In this example, the acceleration sensor 101 is positioned and fixed to detect the acceleration in the direction "a". The direction "a" is one of the three directions "a", "b" and "c" that are defined with respect to the disk 10 and are orthogonal to one another. The direction "a" is a direction that is parallel to the disk surface and parallel or approximately parallel to a direction of relative movement between a head and the disk 10. The direction "b" is a direction that is parallel to the disk surface and parallel or approximately parallel to a disk diameter direction relating to seek operations. The direction "c" is a direction that is parallel to a spin axis (a spindle axis) of the disk 10.

Referring back to FIG. 1, the disk enclosures 11-16 are different in orientation and are densely arranged in such a manner that the entire volume is minimized. More specifically, orientations of the disk enclosures 11-16 in the arrangement are selected so that a total of six of the acceleration sensors 101 housed in the disk enclosures 11-16 one by one can detect acceleration (external forces) in the six different directions "X", "X'", "Y", "Y'", "Z" and "Z'".

The direction "a" that is a detection direction of the acceleration sensor 101 in the disk enclosure 11 is the direction "X". The direction "a" in the disk enclosure 12 is the direction "X'" opposite to the direction "X". The direction "a" in the disk enclosure 13 is the direction "Y" orthogonal to the direction "X". The direction "a" in the disk enclosure 14 is the direction "Y'" opposite to the direction "Y". The direction "a" in the disk enclosure 15 is the direction "Z" orthogonal to both the direction "X" and the direction "Y". The direction "a" in the disk enclosure 16 is the direction "Z'" opposite to the direction "Z".

In this way, in the magnetic disk device 1, the plural acceleration sensors 101 are combined to detect shock in the plural directions. Accordingly, it is possible to use, as each of the acceleration sensors 101, an inexpensive single axis sensor having a simple structure. A two-axis sensor or a three-axis sensor, however, may be used in each of the disk enclosures 11-16 in order to improve detection accuracy. The acceleration sensors 101 are not limited to the piezoelectric type. A capacitance type may be adopted as the acceleration sensors 101.

Figure 3:
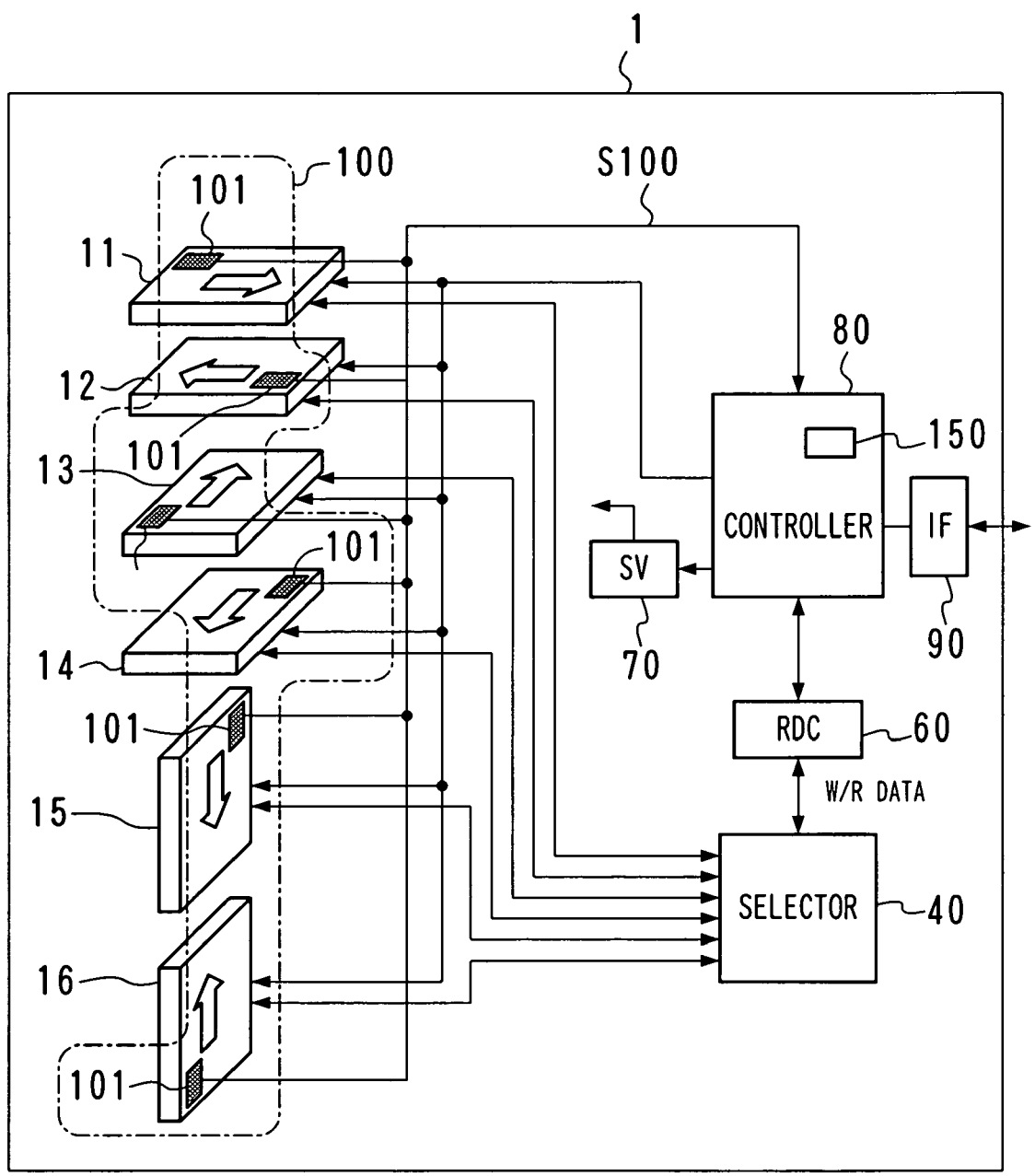
FIG. 3 is a diagram showing a configuration of the first magnetic disk device.

FIG. 3 is a diagram showing a configuration of the first magnetic disk device. The magnetic disk device 1 includes a selector 40, a read channel 60, a servo circuit 70, the controller 80 as described above and an interface 90.

The selector 40 selects a data line corresponding to one disk enclosure designated by the controller 80 among from data buses connected to the disk enclosures 11-16. This enables data exchange between the read channel 60 and the disk enclosure thus designated. The read channel 60 performs modulation and demodulation of record/reproduction, equalization of waveforms and signal discrimination processes. The servo circuit 70 controls spins of the disks. The controller 80 operates to control the entire device including access control unique to the present invention. The interface 90 operates to exchange data and control signals with external data processing equipment.

In the magnetic disk device 1, an external force detection portion 100 made up of the total of six of the acceleration sensors 101 provided in the disk enclosures 11-16 outputs an external force detection signal S100 indicating the magnitude of external forces (acceleration) in the six directions. The external force detection signal S100 is monitored by the controller 80.

The controller 80 is provided with a data table 150 indicating the relationships between each of the disk enclosures 11-16 and directions of external forces against which each of the disk enclosures 11-16 has superior impact resistance. The controller 80 checks the external force detection signal S100 against the data table 150 to determine whether impact resistance of each of the disk enclosures 11-16 is superior or inferior. Then, the controller 80 makes one or more of the disk enclosures that are determined to be superior in impact resistance accessible, i.e., active. When all the disk enclosures 11-16 are determined to be inferior, none is made to be accessible.

Figure 4:
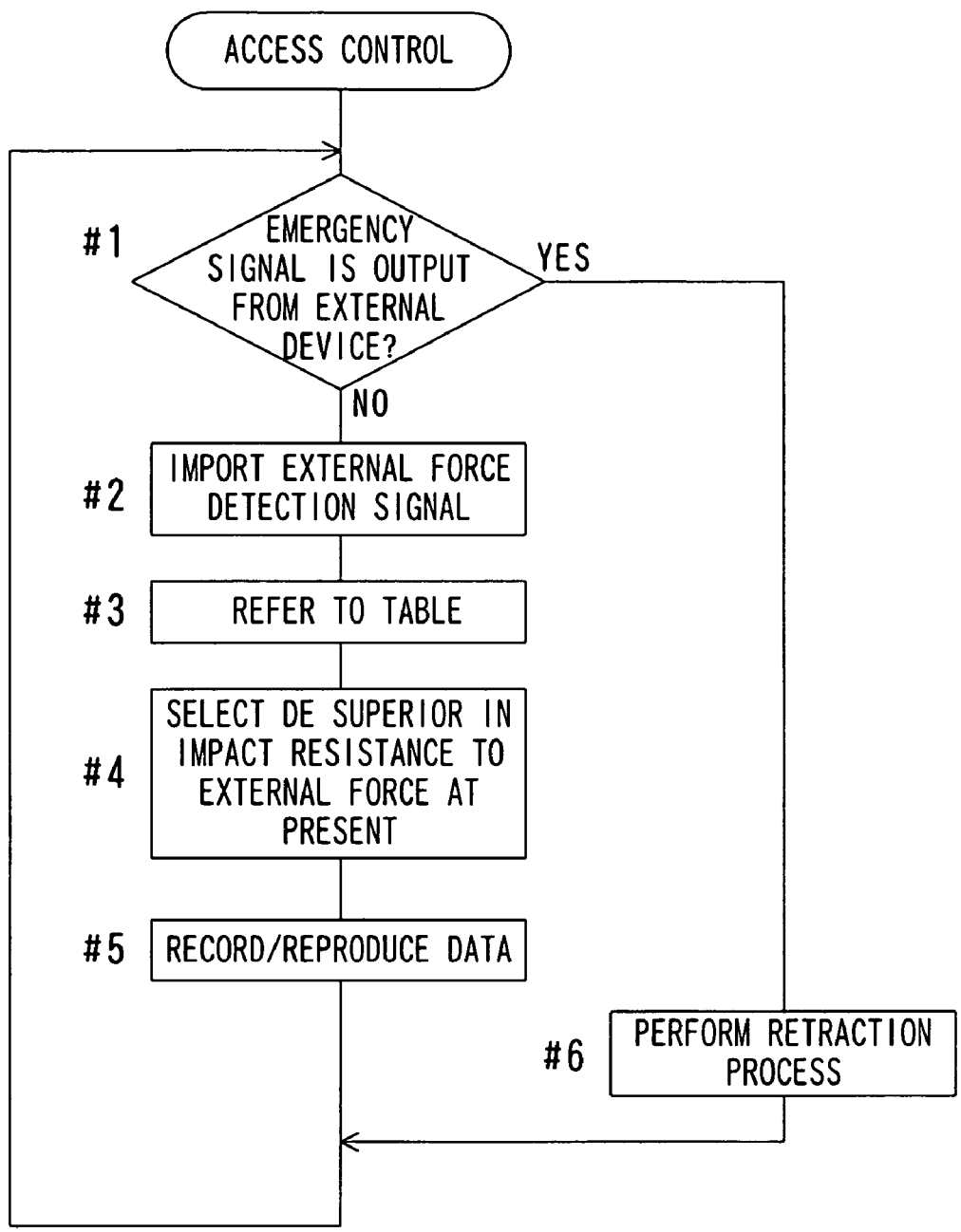
FIG. 4 is a flowchart showing a first example of access control according to the present invention.

FIG. 4 is a flowchart showing a first example of access control according to the present invention.

The controller 80 performs the access control shown in FIG. 4. This access control is realized by a control program that is recorded on the controller 80 in advance.

The controller 80 responds to emergency signals from an external device. The emergency signals include, in the case of in-vehicle units for example, stop orders that are sent from an electronic control unit (ECU) installed in a car to electrical equipment. The ECU is a unit for controlling electrical systems of the car. When a car collision occurs, for example, the ECU detects a signal from an air bag sensor installed in a bumper to inflate an air bag. Such emergency signals sent from the ECU are applicable to drive control of the disk enclosures 11-16.

Responding to an emergency signal, the controller 80 performs a retraction process for instructing all the disk enclosures 11-16 to retract the respective heads (#1 and #7). The disk enclosures 11-16 that received the instructions stop spinning the disks 10 and move the respective heads from record/reproduction areas to retraction areas.

When no emergency signal is output from an external device, the controller 80 imports an external force detection signal S100 (#2). The controller 80 refers to the data table 150 (#3) to select one or more of the disk enclosures 11-16 superior in impact resistance as accessible storage portions (#4). Further, the controller 80 instructs one or more of the disk enclosures 11-16 inferior in impact resistance to retract the respective heads if necessary. After that, in response to requests from external data processing equipment, the controller 80 performs record/reproduction control in which data are recorded only on accessible disk enclosures and data are read only out of the accessible disk enclosures (#5).

Figures 5A, 5B:
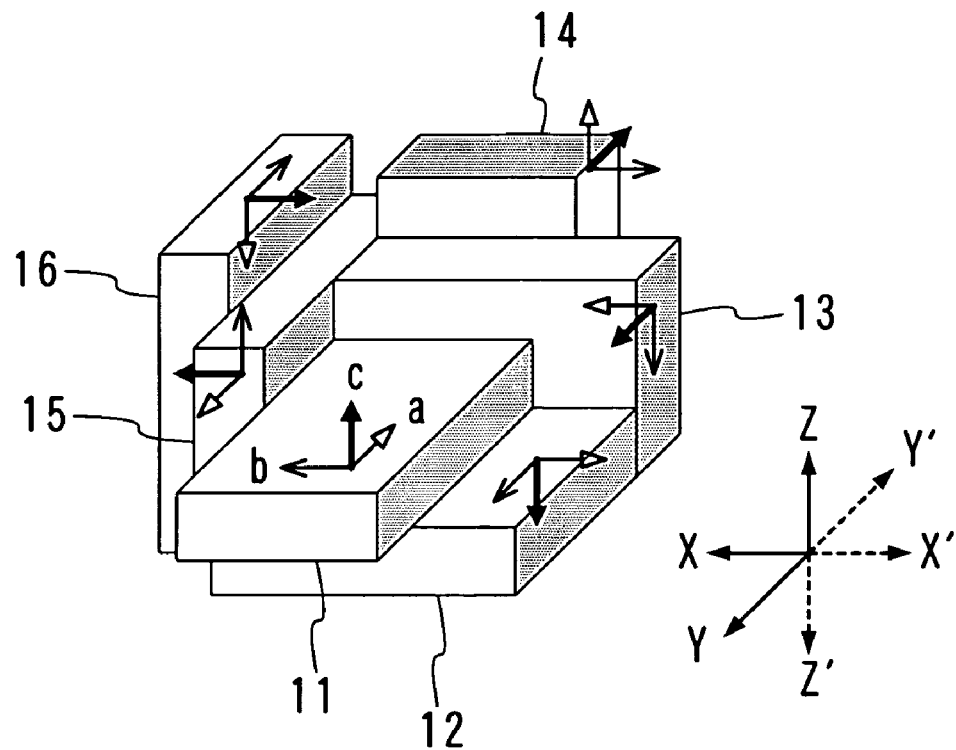
FIGS. 5A and 5B show a modification of a combination of orientations in disk enclosure arrangement.

FIGS. 5A and 5B show a modification of a combination of orientations in disk enclosure arrangement.

Referring to FIG. 5A, the disk enclosures 11-16 are arranged in such a manner that the direction "a" in each of the disk enclosures is not the same as the direction "a" in the other disk enclosures, the direction "b" in each of the disk enclosures is not the same as the direction "b" in the other disk enclosures and the direction "c" in each of the disk enclosures is not the same as the direction "c" in the other disk enclosures. FIG. 5B shows the interrelationship between the directions "a", "b" and "c" in each of the disk enclosures and the directions "X", "X'", "Y", "Y'", "Z" and "Z'" along three axes orthogonal to one another as shown in FIG. 5A.

Here, when attention is directed to the spindle axes, the directions of the spindle axes in the six disk enclosures 11-16 are classified into three directions orthogonal to one another. In the case of, for example, a set of the disk enclosure 11 and the disk enclosure 12 whose directions "c" along the respective spindle axes are opposite to each other, the orientation of the disk enclosure 12 corresponds to the orientation when the disk enclosure 11 is reversed and is rotated by 90 degrees along the front-back direction. Such point symmetry is true of a set of the disk enclosure 13 and the disk enclosure 14 and a set of the disk enclosure 15 and the disk enclosure 16. In each of the sets, the directions of shock received by the respective head gimbal assemblies 19 are shifted to each other by 90 degrees. Accordingly, off-track is less likely to occur in one of the two disk enclosures making one set than the other.

The arrangement of the disk enclosures 11-16 as shown in FIG. 5 makes it possible to increase the probability of performing data record/reproduction safely in at least one of the disk enclosures 11-16, i.e., the probability of not rendering the disk enclosures 11-16 completely non-operational.

Next, descriptions are provided of a modification of the structure of the external force detection portion.

Figure 6:
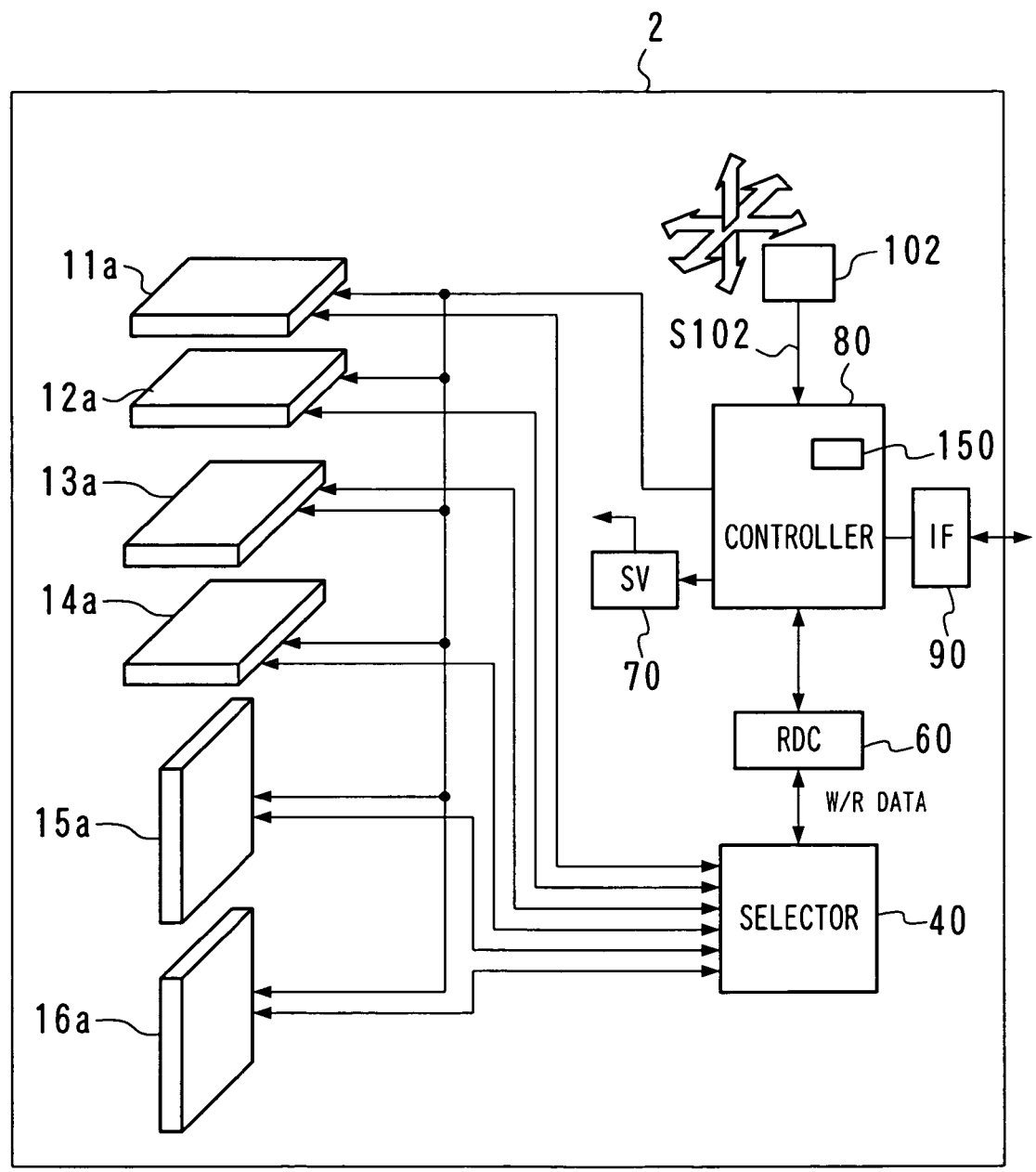
FIG. 6 is a diagram showing a configuration of a second magnetic disk device according to the present invention.

FIG. 6 is a diagram showing a configuration of a second magnetic disk device according to the present invention. In FIG. 6, the same structural elements as in FIG. 3 are marked with the same reference symbols. The same applies to the drawings described below.

The magnetic disk device 2 shown in FIG. 6 has basically the same configuration as the magnetic disk device 1 as described earlier. The feature of the magnetic disk device 2 is that it includes disk enclosures 11a, 12a, 13a, 14a, 15a and 16a, instead of the disk enclosures 11-16, and an acceleration sensor 102 for detecting external forces in six directions.

The disk enclosures 11a-16a have the same structure respectively. The structure corresponds to a structure in which assembly of the acceleration sensor 101 is omitted from each of the disk enclosures 11-16 as described above.

The acceleration sensor 102 that is positioned outside the disk enclosures 11a-16a detects external forces applied to the disk enclosures 11a-16a. The controller 80 controls operations of the disk enclosures 11a-16a based on an external force detection signal S102 outputted by the acceleration sensor 102 in the procedure as shown in FIG. 4.

Figure 7:
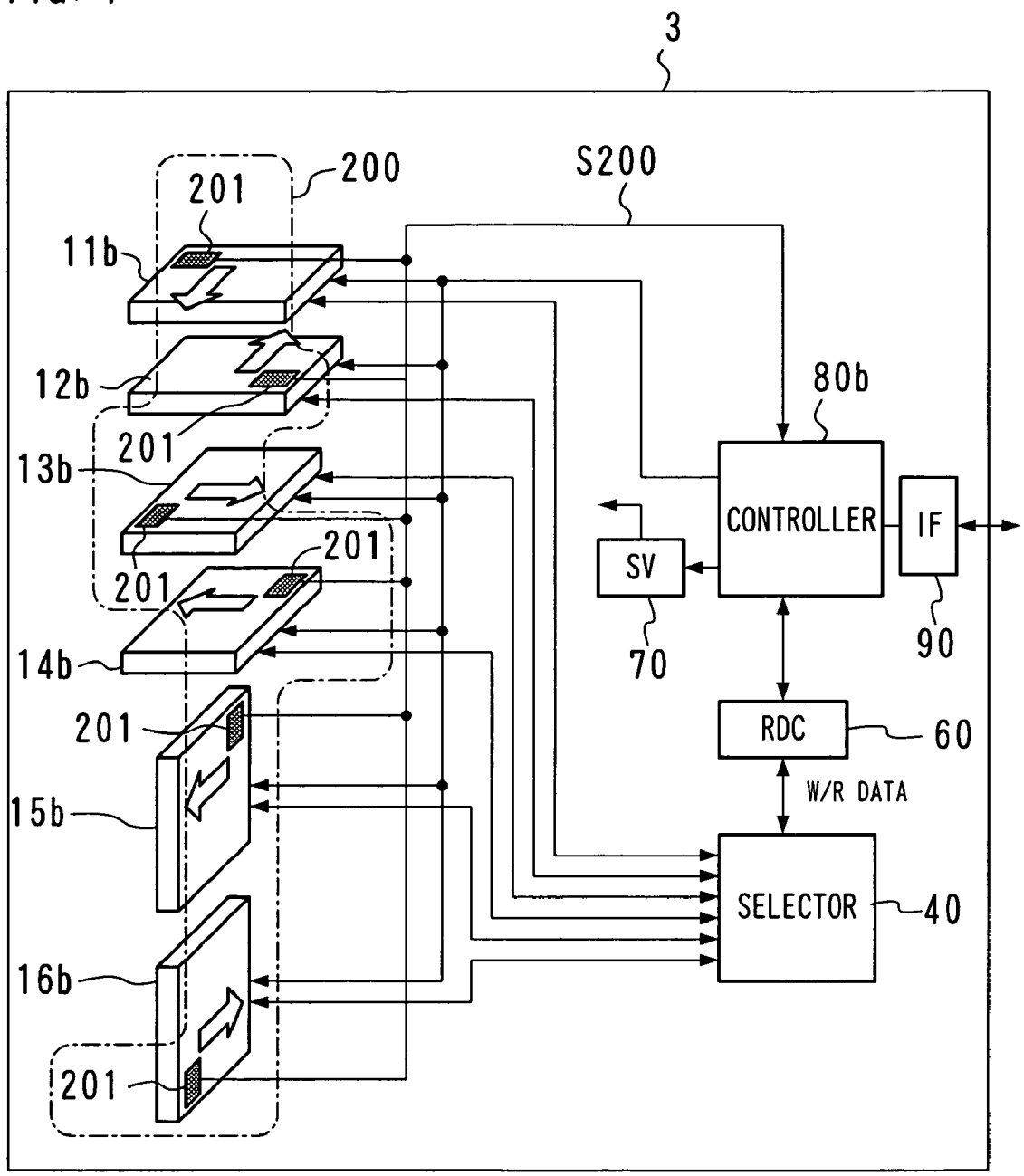
FIG. 7 is a diagram showing a configuration of a third magnetic disk device according to the present invention.

FIG. 7 is a diagram showing a configuration of a third magnetic disk device according to the present invention.

The magnetic disk device 3 has basically the same configuration as the magnetic disk device 1 as described earlier. The feature of the magnetic disk device 3 is that it includes disk enclosures 11b, 12b, 13b, 14b, 15b and 16b instead of the disk enclosures 11-16 as described earlier.

The disk enclosures 11b-16b have the same structure respectively. The structure corresponds to a structure in which an acceleration sensor 201, instead of the acceleration sensor 101, is assembled in each of the disk enclosures 11-16 as described earlier.

In each of the disk enclosures 11b-16b, the acceleration sensor 201 is positioned and fixed to detect shock in a direction that most affects an access operation. The detection directions include, for example, a seek direction deeply involved in off-track. It is not necessary, however, to limit the acceleration sensor 201 to a single axis sensor. The acceleration sensor 201 may be a sensor that detects shock in plural directions, assigns weights to the respective directions depending on the shock effect and outputs signals in which detection results in the plural directions are synthesized. In short, the acceleration sensor 201 is required to indicate degrees of effect that the respective disk enclosures 11b-16b receive due to certain shock.

With the magnetic disk device 3, a total of six of the acceleration sensors 201 included in the disk enclosures 11b-16b constitute an external force detection portion 200. The external force detection portion 200 outputs an external force detection signal S200 indicating a detection result by each of the six acceleration sensors 201. The external force detection signal S200 is monitored by a controller 80*b*.

Figure 8:
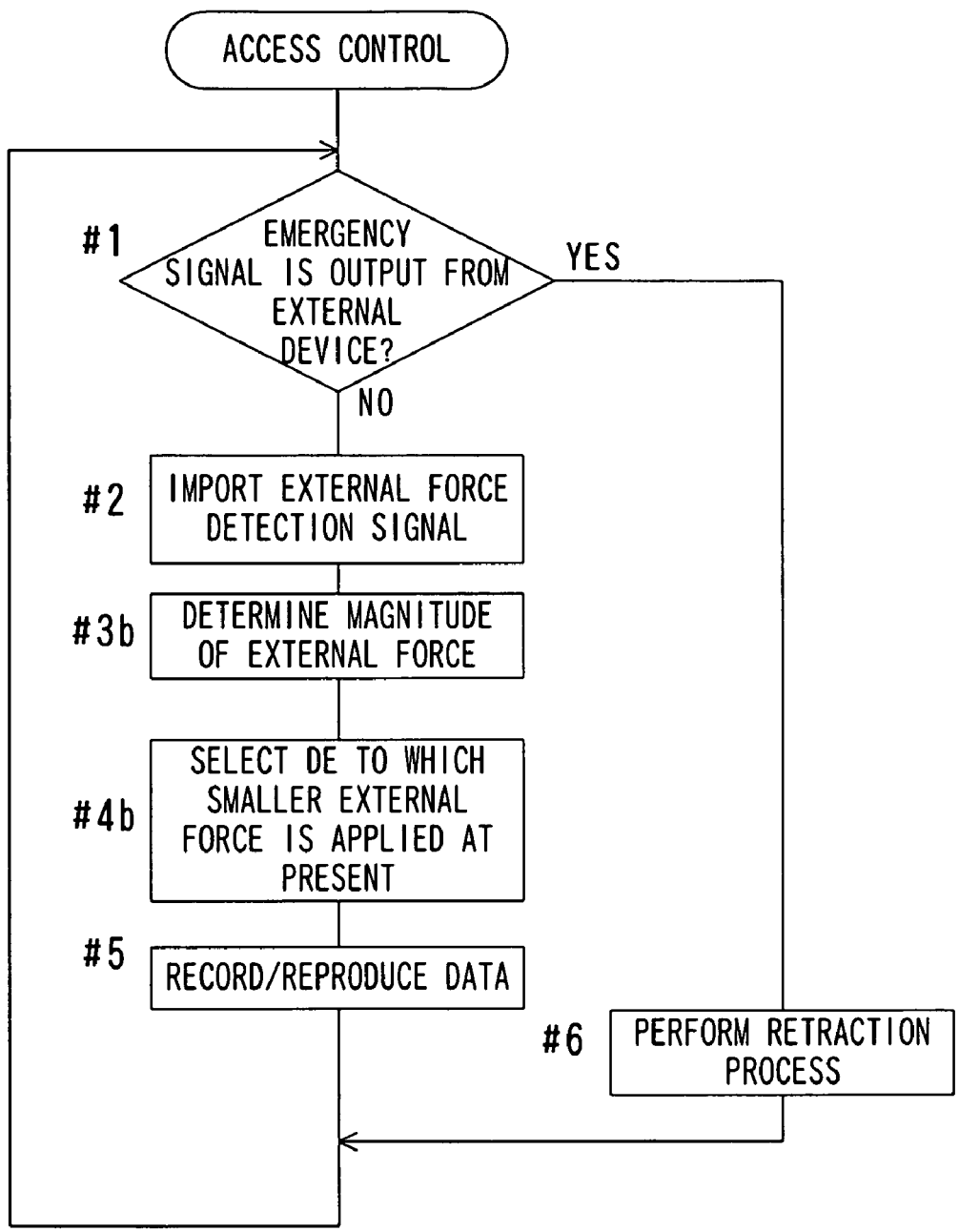
FIG. 8 is a flowchart showing a second example of access control according to the present invention.

FIG. 8 is a flowchart showing a second example of access control according to the present invention.

The controller 80*b* executes access control as shown in FIG. 8. According to the access control in this example, the following process is performed instead of the Step #3 and the Step #4 shown in FIG. 4.

The controller 80*b* determines the magnitude of an external force applied to each of the disk enclosures 11*b*-16*b*, i.e., determines whether or not the external force exceeds a set value based on an external force detection signal S200 (#3*b*). The controller 80*b* selects, as an accessible storage portion, one or more of the disk enclosures 11*b*-16*b* to which a smaller external force is applied (#4*b*). As the need arises, the controller 80*b* instructs one or more of the disk enclosures 11*b*-16*b* to which a larger external force is applied to retract the respective heads.

Figure 9:
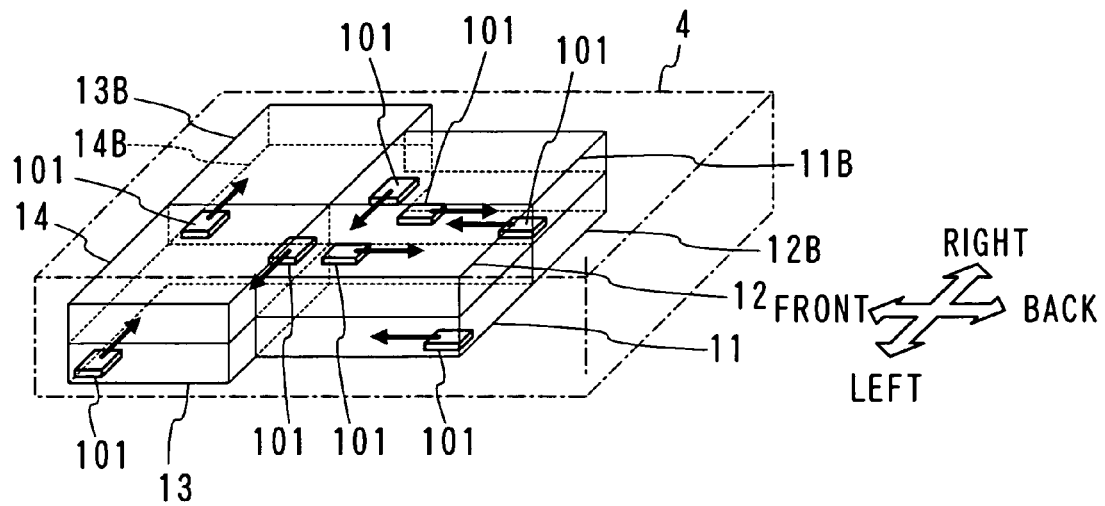
FIG. 9 is a diagram showing a schematic configuration of a fourth magnetic disk device according to the present invention.

FIG. 9 is a diagram showing a schematic configuration of a fourth magnetic disk device according to the present invention.

The magnetic disk device 4 shown in FIG. 9 is suitable for use in vehicles. When the magnetic disk device 4 is used for an in-vehicle system, large part of shock and vibration occur along two axes including a front-back direction and a left-right direction unless a car overturns. In such an application, external forces in six directions need not necessarily be detected and a configuration may be adopted in which external forces in four directions are detected.

The magnetic disk device 4 includes a total of eight disk enclosures 11-14 and 11B, 12B, 13B and 14B. Of the eight disk enclosures, four of the disk enclosures 11-14 are oriented toward front, back, left and right, and the orientations of the disk enclosures 11-14 in the arrangement differ from one another. The front, back, left and right described herein means directions when the magnetic disk device 4 is installed in a car. The orientations in the arrangement correspond to the detection directions (the direction "a" shown in FIG. 2) of the acceleration sensors 101.

The remaining four disk enclosures 11B-14B are oriented toward front, back, left and right as in the case of the disk enclosures 11-14. The orientations of the disk enclosures 11B-14B in the arrangement differ from one another. Each of the disk enclosures 11B-14B has the same structure as each of the disk enclosures 11-14. Stated differently, in the magnetic disk device 4, a set of the disk enclosures 11-14 is arranged parallel with a set of the disk enclosures 11B-14B and two of the disk enclosures correspond to front, back, left and right, respectively.

Increasing the number of disk enclosures contributes to improvement in impact resistance. Generally, a disk with a smaller diameter requires a head gimbal assembly 19 with a shorter length. This enables provision of a structure having higher impact resistance. Accordingly, in the case of obtaining a desired storage capacity, in terms of impact resistance, it is more advantageous to increase the number of disk enclosures to adopt small disks, compared to the case where the number of disk enclosures is reduced to use relatively larger disks.

In the arrangement according to this example, the set of the disk enclosures 11-14 is equal to the set of the disk enclosures 11B-14B in impact resistance. Accordingly, a mirrored drive configuration is adopted in which one of the two sets operates as a master, which can enhance data safety.

In the drawing, the outer shapes of the disk enclosures 11-14 and 11B-14B are rectangular solid for easy understanding of the orientation differences in the arrangement. However, the outer shapes of them are arbitrary. For the purpose of rendering the overall shape of the dense arrangement orderly, it is desirable that the outer shape of each of the disk enclosures 11-14 and 11B-14B be parallelepiped whose upper and lower surfaces are square. The arrangement form is not limited to the two-tier form as shown in FIG. 9. The arrangement form may be multi-tire form such as three-tier or more. The disk enclosures may be arranged in a single layer instead of being stacked. It may be unnecessary to arrange the disk enclosures in a dense manner. In the case where a disk has a diameter of 1.8 inches or 1 inch, eight disk enclosures are arranged as shown in FIG. 9, which makes it possible to adapt the size of the magnetic device 4 to be the current standard form factor in which a disk having a diameter of 3.5 inches or 2.5 inches is assumed.

Figure 10:
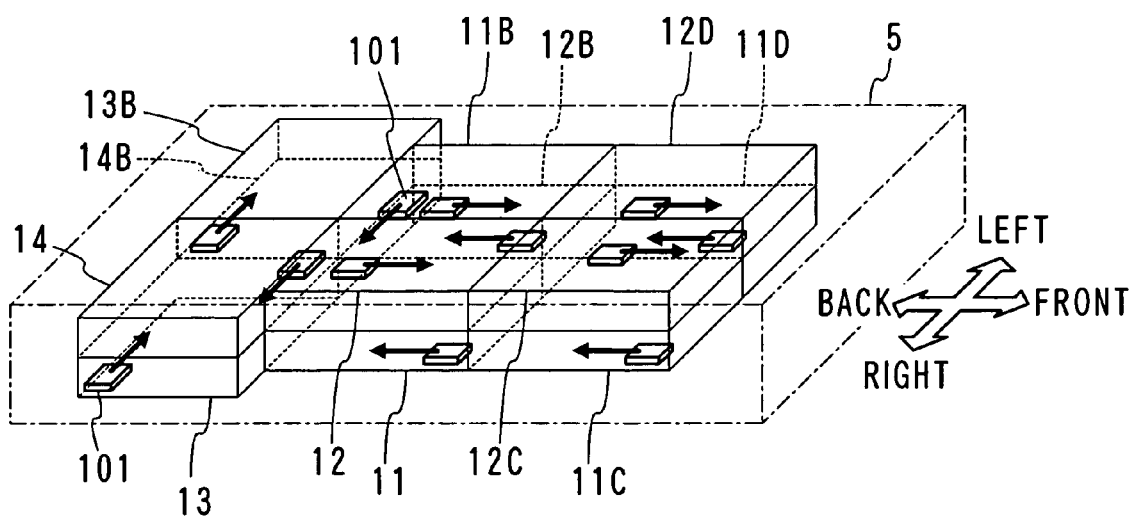
FIG. 10 is a diagram showing a schematic configuration of a fifth magnetic disk device according to the present invention.

FIG. 10 is a diagram showing a schematic configuration of a fifth magnetic disk device according to the present invention.

The magnetic disk device 5 shown in FIG. 10 has a configuration in which four disk enclosures 11C, 11D, 12C and 12D are further incorporated into the magnetic disk device 4 shown in FIG. 9. The disk enclosures 11C and 11D are oriented toward front, like the disk enclosure 11, and the disk enclosures 12C and 12D are oriented toward back, like the disk enclosure 12. Stated differently, in the magnetic disk device 5, two of the disk enclosures correspond to the right direction and the left direction respectively and four of the disk enclosures correspond to the front direction and the back direction respectively.

More disk enclosures are made to correspond to a specific direction than the other directions. Thereby, it is possible to provide a structure having high resistance to shock in a specific direction, i.e., a structure in which troubles are less likely to occur.

The magnetic disk devices 4 and 5 shown in FIGS. 9 and 10 respectively can also perform access control of switching the disk enclosures dynamically to render one or more of the disk enclosures active depending on an external force, as described above.

FIGS. 11A-11D show modifications of the device configuration.

Figure 11A:
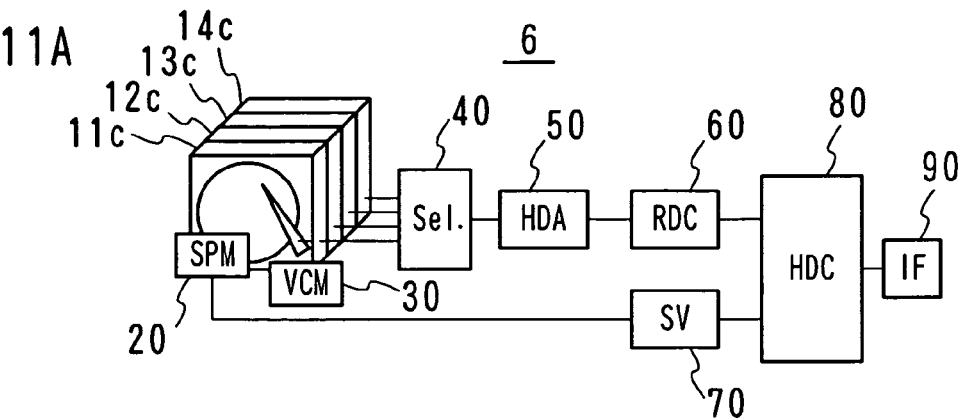
FIGS. 11A-11D show modifications of the device configuration.

A magnetic disk device 6 shown in FIG. 11A includes four disk enclosures 11*c*, 12*c*, 13*c* and 14*c*. The magnetic disk device 6 is characterized in that only one spindle motor (SPM) 20 for turning disks and only one voice coil motor (VCM) 30 for performing seek operations are provided outside the four disk enclosures 11*c*-14*c*. The spindle motor 20 turns all the disks in the disk enclosures 11*c*-14*c* at the same time and the voice coil motor 30 drives all the head gimbal assemblies in the disk enclosures 11*c*-14*c* at the same time.

The disk enclosures 11*c*-14*c* are stacked four high. Thereby, a spindle axis is common to the disk enclosures 11*c*-14*c* and orientations of the disk enclosures 11*c*-14*c* in the arrangement can be different from one another.

With the configuration in which one spindle motor 20 is used to turn media as in this example, disk spins in one disk enclosure are synchronized with disk spins in the other disk enclosures, enabling record/reproduction to be performed at high speeds.

Figure 11B:
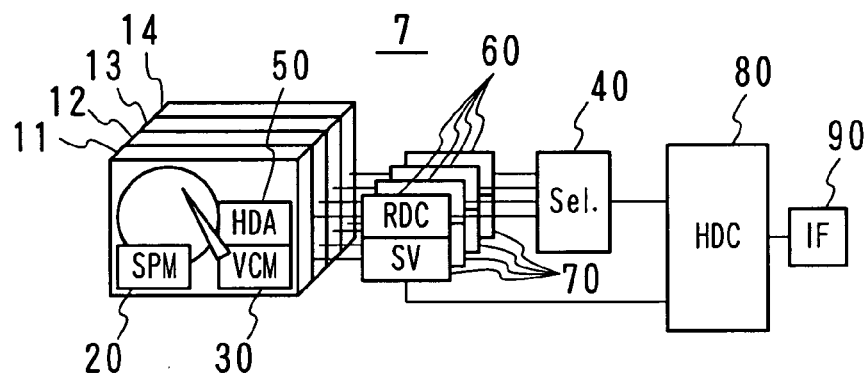

A magnetic disk device 7 shown in FIG. 11B is characterized in that the read channel 60 and the servo circuit 70 are provided in each of the disk enclosures 11-14. With the configuration in which the spindle motor 20 is included in each of the disk enclosures as shown in this example, it is preferable that packet recording is performed for each of the disk enclosures, the disk spins in all the disk enclosures are not strictly synchronized with one another and data are combined on a memory of a signal system.

Figure 11C:
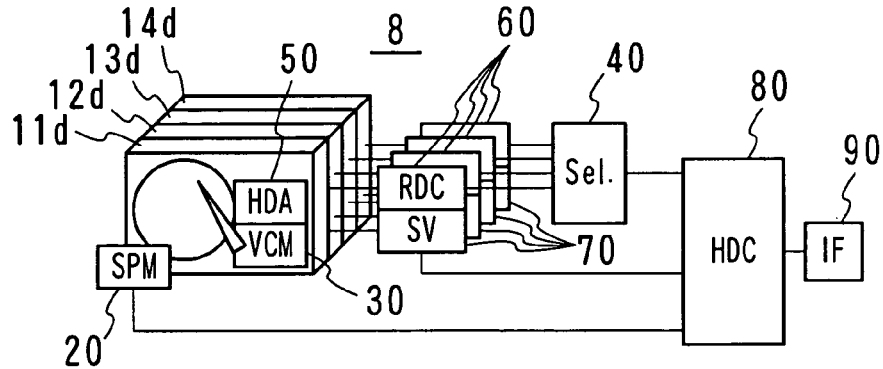

A magnetic disk device 8 shown in FIG. 11C is characterized in that the voice coil motor 30 and the head amplifier 50 are provided in each of the disk enclosures 11d-14d and one spindle motor 20 is provided for these disk enclosures.

Figure 11D:
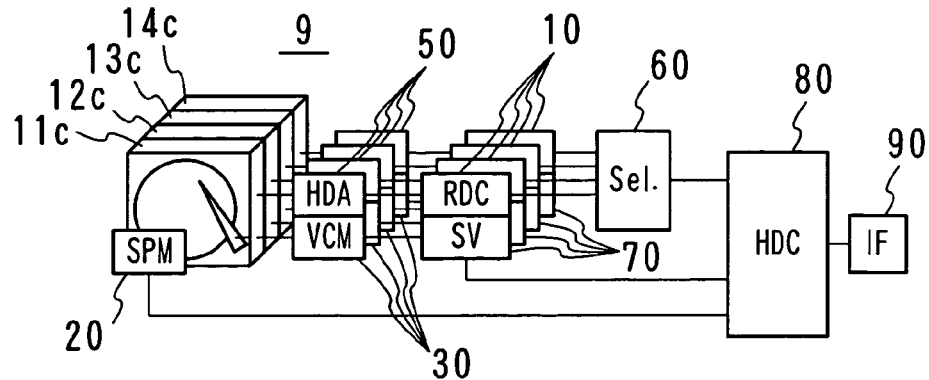

A magnetic disk device 9 shown in FIG. 11D is characterized in that it includes disk enclosures 11c-14c, as in the example shown in FIG. 11A, and the voice coil motor 30 and the head amplifier 50 are provided in each of the disk enclosures 11c-14c. According to this example, an electric circuit is arranged outside the disk enclosures 11c-14c, which is suitable for integration of circuits.

The record control described below can apply to the magnetic disk devices 1-9. The record control realizes longer lasting data storage in which the initial reliability can be maintained for a long period of time.

Figure 12:
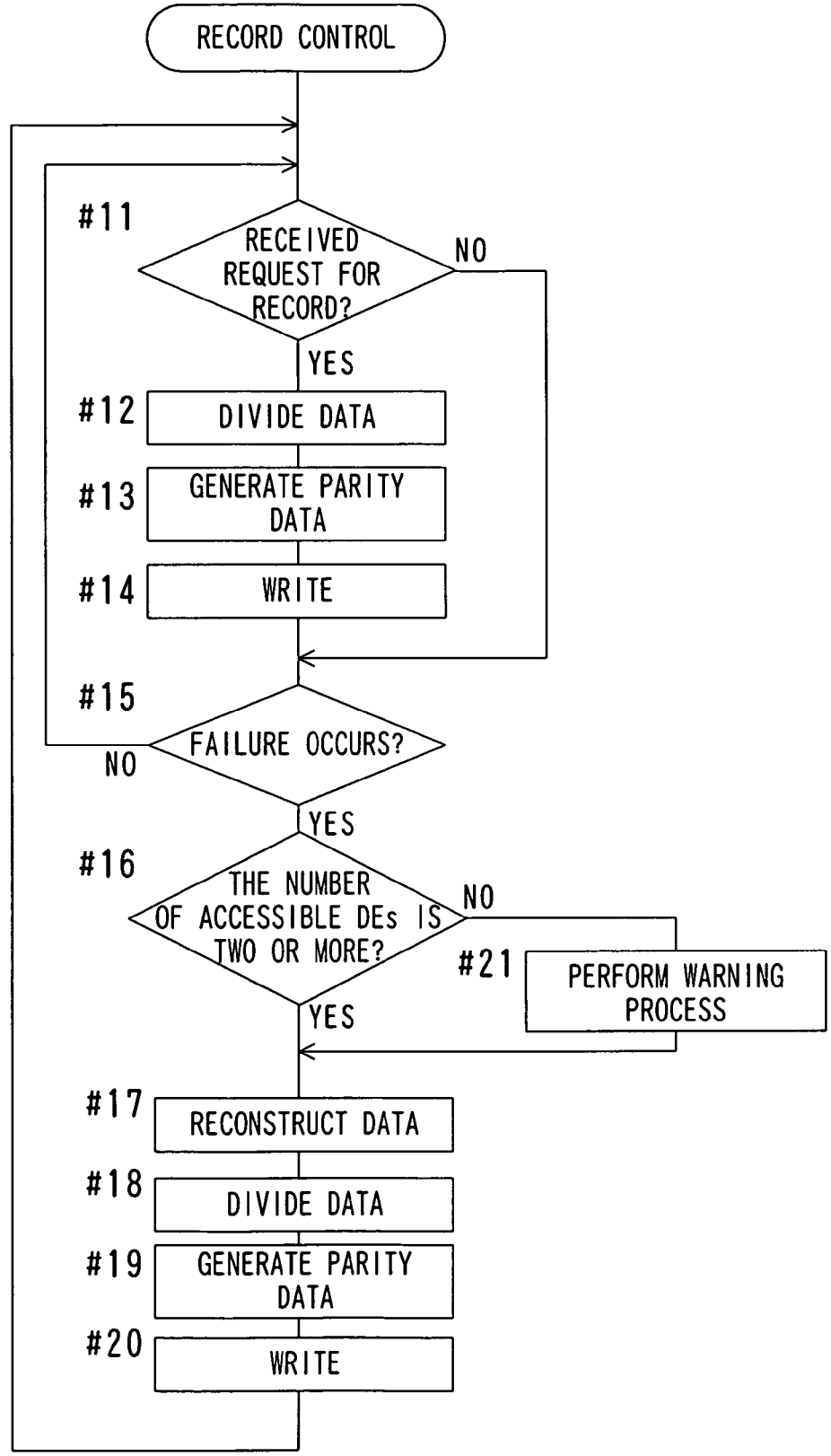
FIG. 12 is a flowchart showing an outline of record control.
Figure 13:
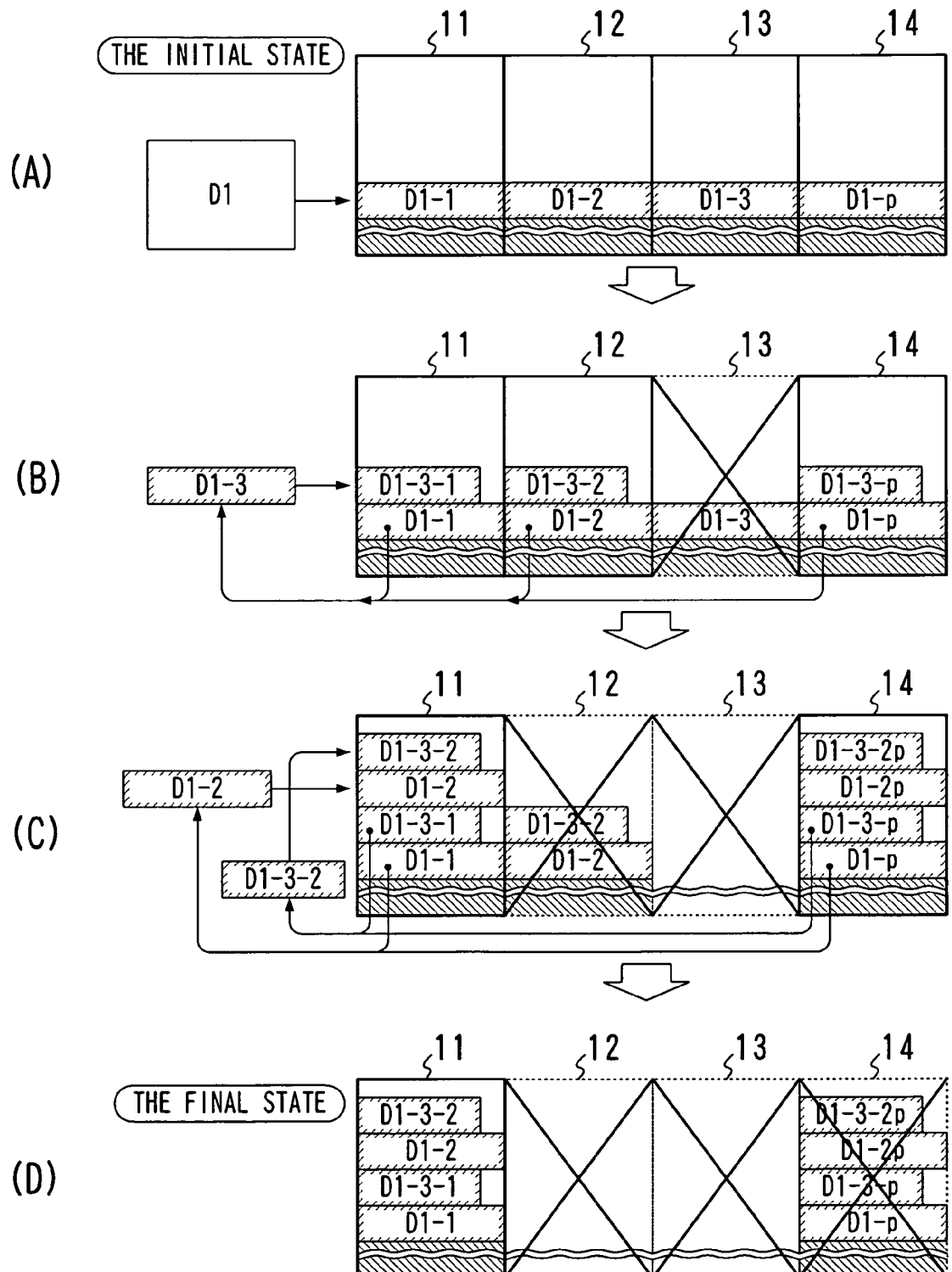
FIG. 13 is a diagram for explaining storage of redundancy-variable data.

FIG. 12 is a flowchart showing an outline of record control and FIG. 13 is a diagram for explaining storage of redundancy-variable data. For convenience of description, hereinafter, the number of disk enclosures is made four. The following is a description of control under in the case.

When receiving a request for record from an external device, the controller 80 divides data that are to be recorded and are obtained via the interface 90 into data whose number is the number that is obtained by subtracting one from the number of DEs operating normally at the time point (#11 and #12 in FIG. 12). Then, parity data that correspond to the data blocks thus obtained by the division are generated (#13). After that, the data blocks and the parity data are distributed to the disk enclosures and are written thereinto (#14).

Referring to FIG. 13(A), for example, in the case of the initial state where all the four disk enclosures 11-14 operate normally, data D1 to be recorded are divided into three (=4-1) data blocks D1-1, D1-2 and D1-3, and then parity data D1-$p$ are generated using the exclusive OR operation of the data blocks. Then, the data blocks D1-1, D1-2 and D1-3 and the parity data D1-$p$ are written into the disk enclosure 11, the disk enclosure 12, the disk enclosure 13 and the disk enclosure 14 respectively. When all the data are finished being written, File Allocation Tables (FAT) that are previously provided in the disk enclosures 11-14 are updated.

Such a process is well known and is performed every time when a request for record is received from an external device. Shaded areas shown in FIG. 13(A) indicate data that have been written before the data blocks D1-1, D1-2 and D1-3 and the parity data D1-$p$ are written. It is possible to fix the disk enclosure into which parity data are written or possible to change the same appropriately.

Referring back to FIG. 12, when a notice indicating that any of the disk enclosures 11-14 fails is received from a process that monitors success and failure of record/reproduction operations (#15), it is checked whether or not the number of accessible disk enclosures is two or more (#16). When there is only one accessible disk enclosure, in other words, when two of the disk enclosures already failed and failure this time occurs in second to last disk enclosure, it is impossible to make data storage redundant and further recorded data may be lost. Accordingly, a warning process is performed for requesting an external device to inform a user (#21).

In contrast, when there are two or more accessible disk enclosures, a storage reorganization process is performed in the following manner.

First, data that were stored in a disk enclosure that has become inaccessible before the disk enclosure becomes inaccessible are reconstructed based on data that are stored in the remaining storage units (#17). Secondly, the reconstructed data are divided into data whose number is the number that is obtained by subtracting one from the number of disk enclosures operating normally at the time point (#18). Parity data are generated that correspond to the one or more reconstructed data blocks thus obtained by the division (#19). Lastly, the reconstructed data blocks and the parity data are distributed to plural accessible storage units and are stored therein (#20).

The operations mentioned above are described again with reference to FIG. 13.

Suppose that the data blocks D1-1, D1-2 and D1-3, and the parity data D1-$p$ are recorded as shown in FIG. 13(A) and after that the disk enclosure 13 fails as shown in FIG. 13(B), for example. In practically, it is usually the case that after the data blocks D1-1, D1-2 and D1-3, and the parity data D1-$p$ are recorded and before the disk enclosure 13 fails, further data blocks and parity data are recorded in the disk enclosure 11-the disk enclosure 14. In this example, however, attention is focused on the illustrated data blocks D1-1, D1-2 and D1-3 and processes to be performed thereon are described for easy understanding. The processes are performed in the same way on other data blocks that are already stored.

Since the disk enclosure 13 fails, the data block D1-3 that were stored in the disk enclosure 13 before the failure are reconstructed based on the data blocks D1-1 and D1-2 and the parity data D1-$p$ that are stored in the remaining disk enclosure 11, disk enclosure 12 and disk enclosure 14 respectively using the exclusive OR operation. The reconstructed data block D1-3 is divided into two (=3-1) reconstructed data blocks D1-3-1 and D1-3-2 and then parity data D1-3-$p$ are generated that correspond thereto. After that, the reconstructed data blocks D1-3-1 and D1-3-2 and the parity data D1-3-$p$ are distributed to the disk enclosure 11, the disk enclosure 12 and the disk enclosure 14 respectively, to be stored in the same respectively.

Stated differently, as shown in FIGS. 13(A) and 13(B), responding to failure of any of the disk enclosure 11-the disk enclosure 14, all the information that was stored in the failed disk enclosure 11, disk enclosure 12, disk enclosure 13 or disk enclosure 14 before the failure is recorded once again in the remaining disk enclosure 11, disk enclosure 12 or disk enclosure 14 other than the failed disk enclosure in a distributed manner. Before the failure, the number M of data blocks is three, the number m of parity data is one and the redundancy is 1/4. In contrast, after the failure, the redundancy is 1/3. While the capacity factor of the storage area decreases with increasing the redundancy, existing information is retained and the same reliability as before is obtained. In other words, even if any further disk enclosure fails, data loss can be avoided.

Further, suppose that the disk enclosure 12 fails as shown in FIG. 13(C).

Since the disk enclosure 12 fails, the reconstructed data block D1-3-2 that were stored in the disk enclosure 12 before the failure are reconstructed based on the reconstructed data block D1-3-1 and the parity data D1-3-$p$ that are stored in the remaining disk enclosure 11 and disk enclosure 14 respectively. The reconstructed data block D1-3-2 thus reconstructed is combined with the reconstructed data block D1-3-1 that is stored in the disk enclosure 11 to reproduce the data block D1-3. The data block D1-2 are reconstructed based on the data block D1-3 thus reproduced and the data block D1-1 and the parity data D1-$p$ that are stored in the disk enclosure 11 and the disk enclosure 14 respectively. After that, the reconstructed data block D1-2 and parity data D1-2$p$ corresponding thereto are distributed to the disk enclosure 11 and the disk enclosure 14 respectively, to be stored in the same respectively. At the same time, the reconstructed data block D1-3-2 thus reconstructed and parity data D1-3-2$p$ corresponding thereto are distributed to the disk enclosure 11 and the disk enclosure 14 respectively, to be stored in the same respectively. Along with this, the redundancy is changed to 1/2.

Moreover, as shown in FIG. 13(D), the failure of the disk enclosure 14 causes the final state where only one disk enclosure 11 is accessible. In this final state also, data that are stored in the disk enclosure 11 can be used to reconstruct the data block D1-2, so that the original data D1 can be reproduced. The redundancy, however, is zero. When the disk enclosure 11 fails afterward, all the information is naturally lost. Thus, it is desirable that when the unit reaches the final state at the latest, a user is notified that the unit has little time left to live. It is possible to notify the user accordingly before the unit reaches the final state.

Figure 14:
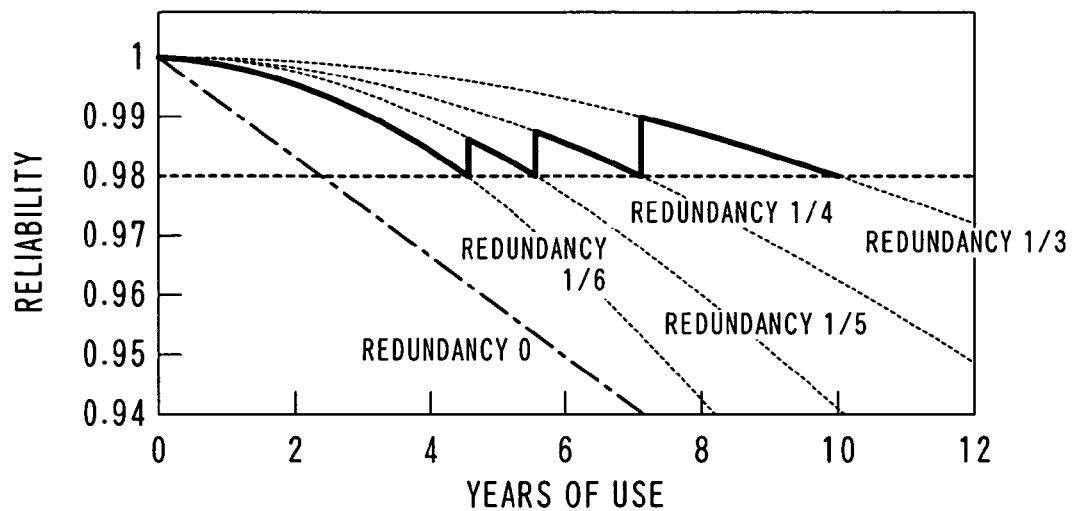
FIG. 14 is a graph showing maintenance of reliability.
Figure 15:
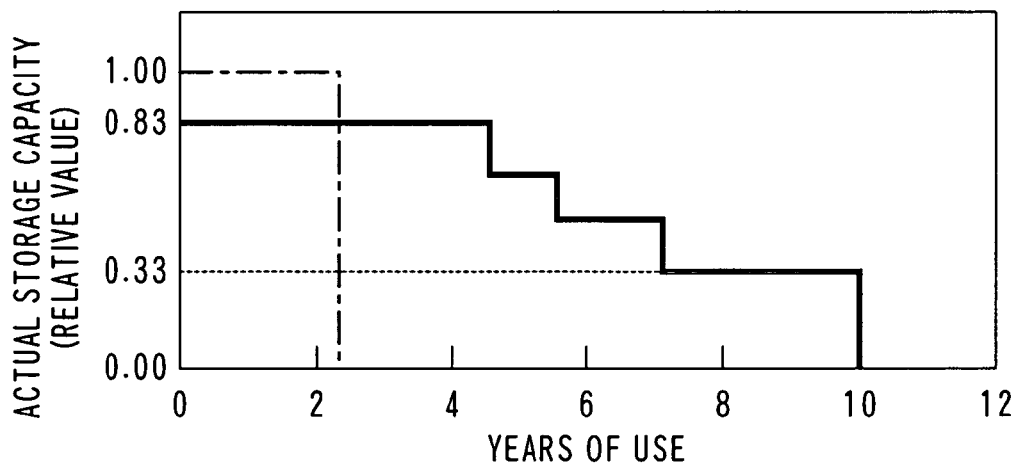
FIG. 15 is a graph showing improvement of a life.

FIG. 14 is a graph showing maintenance of reliability and FIG. 15 is a graph showing improvement of a life. The examples illustrated in FIGS. 14 and 15 show the case where a magnetic disk device is made up of six disk enclosures whose Mean Time Between Failures (MTBF) is equivalent to that of conventional typical magnetic disk devices. The tolerance lower limit of reliability is set to 0.98 in this example.

As described above, the redundancy is changed and the data record operation is continued, leading to the maintenance of reliability of data security and the longer life. As represented by a dot-dash line in FIG. 14, in the case of conventional hard disk drives, when two years have passed after starting on the same, the reliability drops down to approximately 0.98. In contrast, in the case of magnetic disk devices to which the record control described above is applied, the magnetic disk devices reach the first time point when the reliability drops down to 0.98 when four to five years have passed after starting on the same. If one disk enclosure fails at the first time point, the redundancy is changed and the reliability becomes larger than 0.98. Then, after the time passes again, it comes to the second time point when the reliability drops down to 0.98. Further change of the redundancy causes the reliability to have a value larger than 0.98. By such repetition, the years of use before the redundancy reaches 1/3 and the reliability reaches 0.98 is ten years or more, which means that high reliability is continuously maintained five times longer than the conventional cases.

FIG. 15 shows a comparative example of recordable/reproducible capacity. The initial capacity is lower than the conventional example indicated by a dot-dash line by capacity corresponding to the larger redundancy. Suppose that, however, failure occurs averagely when the reliability reaches a value of 0.98. In such a case, record/reproduction processes become wholly impossible after approximately two and a half years have passed in conventional cases. In contrast, while capacity of the magnetic disk device according to this example gradually becomes lower, it can perform record/reproduction processes over ten years or more even if the magnetic disk device stops being used at the time point of the redundancy 1/3. More specifically, it should be understood that the magnetic disk device according to the present invention has a long life.

In the embodiments described above, plural magnetic disk devices having the same structure as the magnetic disk devices 1-9 may be combined with one another to establish a RAID system. The magnetic disk devices 1-9 may be structured respectively as one archive device. The number of disk enclosures is not limited to the number as illustrated in the embodiments and is arbitrary, providing that it is two or more.

The present invention is suitable for fixed disk devices and also applicable to storage devices including any storage medium such as an optical disk, a magneto-optical disk or a semiconductor memory except a magnetic disk.

The present invention contributes to expansion of application of various types of data storage devices including magnetic disk devices.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A data storage device comprising:
   plural storage units as closed structures each of which houses a storage medium disk therein, the storage medium disk being capable of moving relative to a head for access;
   an external force detection portion for outputting signals corresponding to external forces applied to the storage units in plural directions; and
   a controller for controlling the storage units,
   wherein the storage units are arranged in such a manner that surfaces of the storage medium disks are each parallel to surfaces of at least one other storage medium disk and the storage units are wholly or partially different from one another in a direction of relative movement between the storage medium disk and the head, have a substantially identical structure to each other and each of the storage units includes an acceleration sensor for detecting an external force, and
   the controller has information indicating a relationship between each of the storage units and directions of external forces against which each of the storage units has good impact resistance, determines whether each of the storage units has good or poor impact resistance based on the information and the signal outputted from the external force detection portion, selects from among the storage units one or more of the storage units having the good impact resistance, and makes the selected storage unit or storage units perform an access operation.

2. The data storage device according to claim 1, wherein the external force detection portion includes plural acceleration sensors each of which detects an external force in a different direction.

3. A data storage device comprising:
   plural storage units as closed structures each of which houses a storage medium disk therein, the storage medium disk being capable of moving relative to a head for access;
   an external force detection portion for outputting signals corresponding to external forces applied to the storage units in plural directions; and
   a controller for controlling the storage units, wherein the storage units are arranged in such a manner that surfaces of storage medium disks are each parallel to surfaces of at least one other storage medium disk and the storage units are different from one another in a direction of relative movement between the storage medium disk and the head, have a substantially identical structure to each other and each of the storage units includes an acceleration sensor for detecting an external force, and
   the controller determines magnitude of an external force applied to each of the storage units based on the signal outputted from the external force detection portion, selects among from the storage units one or more of the storage units to which a smaller external force is applied, and makes the selected storage unit or storage units perform an access operation.

* * * * *